(12) United States Patent
Gordeev et al.

(10) Patent No.: US 7,048,902 B2
(45) Date of Patent: May 23, 2006

(54) METHOD FOR PRODUCING A POROUS CARBON ARTICLE AND AN ARTICLE PRODUCED THEREBY

(75) Inventors: Sergey Konstantinovitch Gordeev, St. Petersburg (RU); Robert Gustavovitj Avarbz, St. Petersburg (RU); Aleksandr Efimovitj Kravtjik, St. Petersburg (RU); Julia Aleksandrovna Kukusjkina, St. Petersburg (RU); Vasilij Vasilevitj Sokolov, St. Petersburg (RU); Tatjana Vasilevna Mazaeva, St. Petersburg (RU); Alla Grechinskaya, St. Petersburg (RU)

(73) Assignee: FOC Frankenburg Oil Company Est., Vaduz (LI)

( * ) Notice: Subject to any disclaimer, the term of this patent is extended or adjusted under 35 U.S.C. 154(b) by 0 days.

(21) Appl. No.: 09/424,760

(22) PCT Filed: May 29, 1998

(86) PCT No.: PCT/EP98/03204

§ 371 (c)(1),
(2), (4) Date: Feb. 3, 2000

(87) PCT Pub. No.: WO98/54111

PCT Pub. Date: Dec. 3, 1998

(65) Prior Publication Data

US 2003/0180209 A1   Sep. 25, 2003

(30) Foreign Application Priority Data

May 30, 1997   (RU) ................................ 97109619

(51) Int. Cl.
*C01B 31/02*   (2006.01)
(52) U.S. Cl. .................................................. 423/445 R
(58) Field of Classification Search ............. 423/445 R
See application file for complete search history.

(56) References Cited

U.S. PATENT DOCUMENTS 4,543,240 A * 9/1985 Goldberger ................. 423/346
5,876,787 A * 3/1999 Avarbz et al. ................ 427/79

FOREIGN PATENT DOCUMENTS

| | | |
|---|---|---|
| DE | 268 677 | 2/1988 |
| EP | 0 440 569 | 8/1991 |
| FR | 2 390 381 | 12/1978 |
| GB | 982 759 | 2/1965 |
| JP | 2 184511 | 1/1989 |
| SU | 1 497 206 | 10/1987 |
| WO | WO 96 12560 | 10/1994 |
| WO | WO 97/11923 | 4/1997 |
| WO | WO 97/16509 | 5/1997 |
| WO | WO 97/20333 | 6/1997 |

* cited by examiner

*Primary Examiner*—Stuart Hendrickson
(74) *Attorney, Agent, or Firm*—Young & Thompson

(57) ABSTRACT

A workpiece with transport porosity is formed. Nanopores are formed in the workpiece by a thermochemical treatment. The workpiece is formed as a rigid carbonaceous skeleton containing in its structure particles of one or more carbides, being selected and arranged in order to provide predetermined nanopore sizes, a predetermined volume of nanopores and a predetermined distribution of nanopores within the volume of the article dependent on its intended use.

17 Claims, 2 Drawing Sheets

Table 1

| Ex No | Carbide mixture composition (wt%) | Total volume of pores [1], $V_{tot}$ (cc/cc) | Nanopore volume, [2], $V_{np}$ (cc/cc) | Transport pore volume [3], $V_{tr}$ (cc/cc) | Size of pores, calculated [4] (nm) | | Size of pores, measured [5] (nm) | |
|---|---|---|---|---|---|---|---|---|
| | | | | | $X_1$ | $X_2$ | $X_1$ | $X_2$ |
| 1 | 100% TiC | 0,67 | 0,32 | 0,35 | 0,8–0,92 | | 0.8 | |

METHOD FOR PRODUCING A POROUS CARBON ARTICLE AND AN ARTICLE PRODUCED THEREBY

TECHNICAL FIELD

The present invention relates to a method for producing a porous carbon article comprising the steps of forming a workpiece with transport porosity and forming nanopores in said workpiece by thermochemical treatment. The invention also relates to an article produced by said method.

BACKGROUND TO THE INVENTION

From "Application of tubular articles in cryoadsorption pumps//Carbon adsorbents and their application in industries.", Breslavets K. S et al, Moscow, Science publishers, 1983, p. 243, a method for producing a porous carbon article is known. The method comprises a step of forming or extrusion of a paste consisting of silicon carbide powder and commercial synthetic resins as a binder in order to produce a desired article. In this case, transport porosity of the material is formed with pore size above 100 nm. Then a carbonization in an inert medium is carried out in order to strengthen the article and make its structure more uniform. Further the article undergoes a thermochemical treatment by chlorine at 900–1000° C. for transformation of carbide into carbon. In this step, in the volume of the article a nanoporous structure with pore size less than 10 nm is formed.

Use of a polymeric resin as a binder is an obstacle for obtaining high mechanical strength, because of the low mechanical strength of carbonized resin. Resin destruction accompanies formation of carbon which also takes part in the process of forming nanoporosity, but the size of this porosity is practically uncontrollable. As a result, it is impossible to produce materials with predetermined adsorption properties with the known method.

An article produced by means of the known method is a carbon material binded with products of resin carbonization with porosity of 65 to 75 vol % in this case, a part of the pores, 30–32 vol % are transport pores having size greater than 100 nm, while other pores have size less than 10 nm.

Application of articles obtained by the known method is restricted because it gives no possibility to obtain controllable size of pores as well as controllable volumetric content of both transport porosity and nanoporosity.

A number of so called activated carbons with a high content of nanoporosity is known, but the pore size distribution for these materials is very wide and uncontrolled, c.f. "Carbon", John Wiley & Son, N.Y. 1988,USA.

It is thus a need for a method in which the porosities of a porous carbon material which comprise two types of pores can be controlled. The two types are pores of a size less than 10 nm providing adsorption ability and pores of a size greater than 100 nm providing transportation of a component to the pores taking active part in the adsorption process. Articles produced by such a method can be used in different fields of technology connected with adsorption and absorption processes, such as selective absorption of a component from a liquid or gas, electrochemical electrodes, in medicine technologies, etc.

The object of the present invention is to make it possible to produce carbon porous articles with predetermined transport porosity and predetermined nanopore sizes, volume and distribution throughout the volume of the article.

SUMMARY OF THE INVENTION

This object is achieved by a method for producing a porous carbon article comprising the steps of formation of one or more carbide powders to an intermediate body with transport pores, i.e. pores having a size larger than 100 nm, by shaping, characterised by the further steps of, selecting the one or more carbide powders on the basis of dependence of specified nanopore size on physical and chemical constants of the carbides using the relationship;

$$X = Z^*(1-R)/R$$

where
X=specified size of nanopores, nm;
Z=0.65–0.75 nm;
$R = \nu M_c \rho_k / M_k \rho_c$ where
$M_c$—molecular mass of carbon, g/mole;
$M_k$—molecular mass of carbide, g/mole;
$\rho_k$—density of carbide, g/ccm;
$\rho_c$—density of carbon, g/ccm;
$\nu$—number of carbon atoms in carbide molecule, heat treating the intermediate body in a medium of gaseous hydrocarbon or hydrocarbon mixtures at a temperature exceeding the decomposition temperature for the hydrocarbon or hydrocarbons until the mass of the intermediate body has increased at least 3% thereby creating a workpiece in the form of a rigid carbonaceous skeleton, thereafter thermochemically treating the work piece in a medium of gaseous halogens to provide predetermined nanopore sizes, i.e the pores have a size less than 10 nm, a predetermined volume of nanopores, and a predetermined distribution of nanopores within the volume of the article, the carbides used forming carbons having a slot-like structure. By this method materials having controlled and predetermined nanopores, an optimal ratio between volumes of transport pores and nanopores, high mechanical strength and complicated shapes can be produced.

In a preferred embodiment elements from III, IV, V or VI group of Mendeleyv's Periodic system are selected as carbon precursor.

The formulation of carbide particle mixture is chosen in dependence of desired distribution of nanopores by sizes using the relationship;

$$\Psi_i = K_i \phi_i / \Sigma K_i \phi_i$$

where
$\Psi_i$—volumetric part of nanopores with size $x_i$ in total volume of nanopores;
$\phi_i$—volumetric part of i-th carbide in particle mixture;
n—number of carbides;

$$K_i = 1 - \nu M_c \rho_{ki} / M_{ki} \rho_c$$

where
$M_c$—molecular mass of carbon, g/mole;
$M_{ki}$—molecular mass of it-h carbide, g/mole;
$\rho_{ki}$—density of it-h carbide, g/ccm;
$\rho_c$—density of carbon, g/ccm;
$\nu$—number of carbon atoms in carbide molecule.

The intermediate body is formed with a porosity of 30–70 vol %, preferably 35–50 vol %, the porosity being determined with the following relationship;

$$\epsilon_0 = [1 - v_{np}/\Sigma K_i \phi_i]*100$$

where $\epsilon_0$—porosity of intermediate body, vol %;
$\phi_i$—volumetric part of i-th carbide in particle mixture;
$v_{np}$—predetermined volumetric part of nanopores in final article;

$$K_i = 1 - vM_c\rho_{ki}/M_{ki}\rho_c$$

where $M_c$—molecular mass of carbon, g/mole;
$M_{ki}$—molecular mass of it-h carbide, g/mole;
$\rho_{ki}$—density of it-h carbide, g/ccm;
$\rho_c$—density of carbon, g/ccm;
v—number of carbon atoms in carbide molecule.

The treatment in a medium of gaseous hydrocarbon or hydrocarbon is carried out until the mass of the intermediate body has changed according to the following relationship;

$$\Delta m = Q(\epsilon_0 - v_{tr})/(1 - \epsilon_0)$$

where $\Delta m$—relative change of intermediate body mass, g/g;
$\epsilon_0$—porosity of intermediate body, vol %;
$v_{tr}$—predetermined volumetric content of transport pores, vol %;

$$Q = \rho_c/\rho_{mix}$$

Where $\rho_c$ = density of carbon, g/ccm;
$\rho_{mix}$ = density of carbides mixture, g/ccm;

The intermediate body can be formed by pressing. Other well known forming methodes, such as slip casting, tape casting or slurry casting and injection moulding can of course also be used. nNatural gas is used as a mixture of hydrocarbons and the treating in hydrocarbon medium is carried out at 750–950° C.

Alternatively at least one of the hydrocarbons used during the treatment of the intermediate body in hydrocarbons medium is selected from the group of acetylene, methane, ethane, propane, pentane, hexane, benzene and their derivatives and the treating in hydrocarbon medium is carried out at 550–1200° C.

The particles of carbide or carbides of which the intermediate body is formed are arranged uniformly or nonuniformly throughout its volume.

The thermochemical treatment of the workpiece is carried out in a medium of gaseous halogens at 350–1200° C., preferably chlorine. at 500–1100° C.

The present invention relates also to a porous carbon article having nanopores, i.e pores having a size less than 10 nm, and transport pores, i.e. pores having a size grater than 100 nm, characterised in that the article consists of a rigid carbon skeleton in which at least 3% of its mass consists of carbon without nanopores.

In an embodiment the article has nanopores of at least two sizes. Furthermore, the volume of nanopores is 15–50% and the volume of transport pores is 10–55% the nanopores are distributed uniformly or nonuniformly throughout the volume of the article.

BRIEF DESCRIPTION OF THE DRAWING

The present invention will now be described with reference to the following figures, of which.

DESCRIPTION OF PREFERRED EMBODIMENTS OF THE INVENTION

Figures 1, 2:
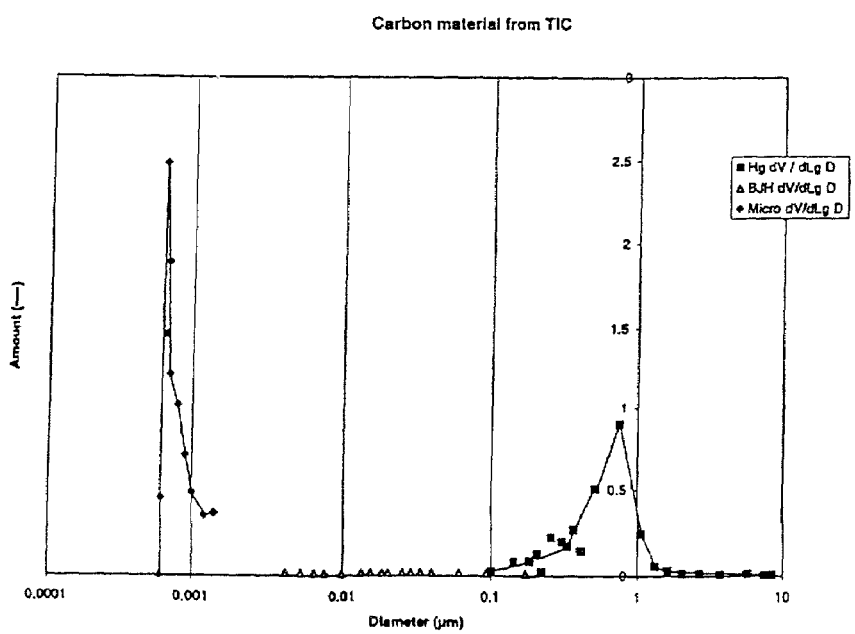
FIG. 1 shows a table of the properties of materials produced in example 1.
FIG. 2 disclose porosimetry data for the sample of example 1–3.
Figure 3:
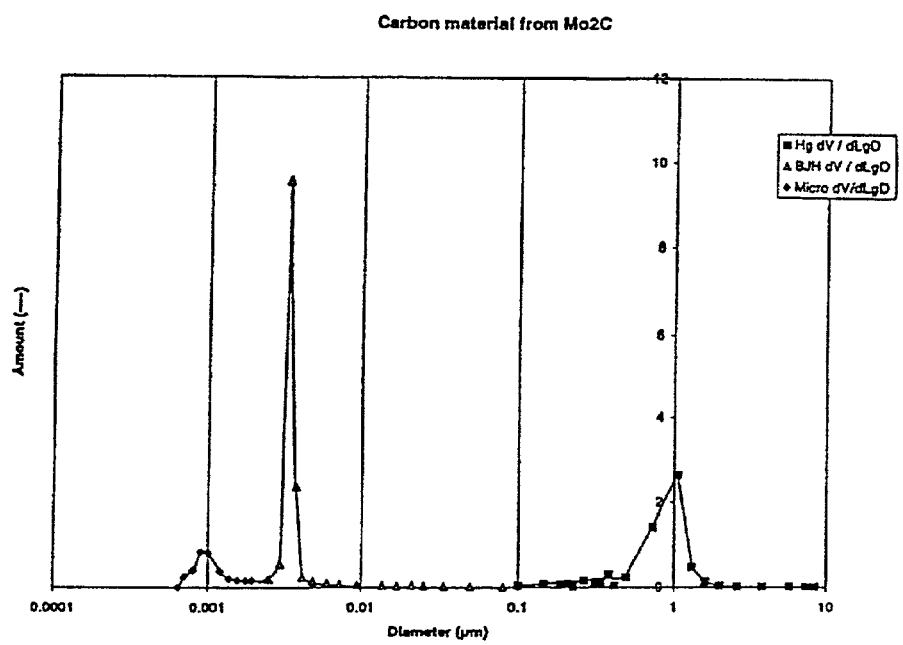
Figure 4:
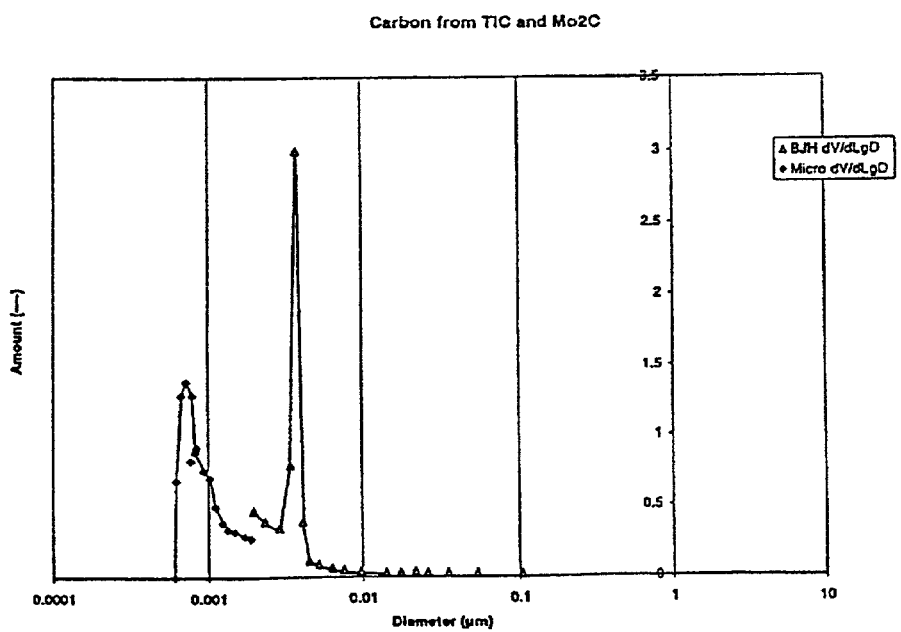

The method according to the invention comprises the following steps:

1) Forming a workpiece with transport porosity using particles of a carbide or carbides of elements from III, IV, V and VI groups of Mendeleyev's Periodic System, in the form of a rigid carbonaceous skeleton containing in its structure particles of a carbide or carbides selected from the said groups and arranged in a predetermined order providing formation in the subsequent steps desired transport porosity and nanoporosity by sizes, volume and distribution of pores throughout the volume of the article;

2) Formation of nanoporosity throughout the volume of a workpiece obtained in the 1st step by thermochemical treatment of the said workpiece in gaseous halogens, such as chlorine, at elevated temperatures in the range of 350 to 1200° C., preferably 500–1100° C.

Current notions of carbon materials structure point out that nanopores generated during the thermochemical treatment process are formed by ordered or disordered graphite planes of carbon, which for simplicity might be considered as shaped as slots, the width of the latter depending on type of carbide used for forming of the workpiece with transport porosity.

These theoretical ideas are in good agreement with experimental data which allowed the inventors to disclose the following dependence for carbon materials having such structure:

$$X = Z*(1-R)/R \qquad (1)$$

where X-predetermined size of nanopores, nm;
Z—experimental factor established for a number of carbide structures of elements from III, IV, V and VI groups of Mendeleyev's Periodic System as 0.65–0.75 nm;

$$R = vM_c\rho_k/M_k\rho_c$$

where $M_c$—molecular mass of carbon, g/mole;
$M_k$—molecular mass of carbide, g/mole;
$\rho_K$—density of carbide, g/ccm;
$\rho_c$—density of carbon, g/ccm;
v—number of carbon atoms in carbide molecule.

A series of preliminary experiments made it possible to choose a necessary carbide to obtain in practice a predetermined size of nanopores.

Particles of a chosen carbide (powder) are formed into an intermediate body with porosity in the range of 30–70 vol % by any known method, e.g. by pressing with or without temporary binder, slip casting, slurry casting. Final step of forming, which results in production of a workpiece with a high mechanical strength and a desired transport porosity, is a treating of the intermediate body in a medium of gaseous hydrocarbon or hydrocarbons mixture at a temperature above their decomposition temperature.

It is possible to use natural gas and/or at least a hydrocarbon selected from the group comprising acetylene, methane, ethane, propane, pentane, hexane, benzene and their derivatives.

Under these conditions a decomposition of hydrocarbon occurs by reaction;

$$C_mH_n \rightarrow mC + {}^n/_2 H_2 \uparrow \qquad (2)$$

with deposition of the generated pyrocarbon on the surface and in the pores of intermediate body volume.

The specified range of initial porosity is baser on the fact that at a porosity below 30% it is difficult to obtain sufficient volume of transport pores in the article providing access of adsorptive to nanopores where adsorption process occurs and at a porosity above 70% the article does not possess satisfactory mechanical strength.

The value of 35–50 vol % is preferable because it is easily achieved by any available method of workpiece forming and it assures an optimal relation between volumes of transport pores and nanopores in the article.

The size and distribution of the transport pores can be controlled by selecting appropriate particle sizes and particle distribution. The amount of possible particle packing due to the forming process will of course also influence the porosity of the work piece.

Calculation of concrete value of intermediate body porosity necessary to obtain a predetermined volume of nanopores, is carried out using the following expression:

$$\varepsilon_0 = \left[1 - v_{np} \Big/ \sum_{i=1}^{n} K_i \varphi_i \right] \cdot 100 \qquad (3)$$

where
$\varepsilon_0$—porosity of intermediate body, vol %;
$\varphi_i$—volumetric part of i-th carbide in powder mixture;
$V_{np}$—predetermined volumetric part of nanopores in final article.

$$K_i = 1 - \nu M_c \rho_{ki} / M_{ki} \rho_c$$

where
$M_c$—molecular mass of carbon, g/mole;
$M_{ki}$—molecular mass of i-th carbide, g/mole;
$\rho_c$—density of carbon, g/ccm;
$\rho_{ki}$—density of i-th carbide, g/ccm:
$\nu$—number of carbon atoms in carbide molecule;
n—number of carbides in the mixture.

Duration of treating in the said medium is controlled by measuring the mass of the article. When the mass has changed by at least 3%, the strength is already sufficient for use of the article as adsorption element, capacitor electrode or chromatography membrane, for instance.

The process is usually completed when the mass is changed by 3–20%, thus providing necessary strength of the article and its transport porosity. Lower and upper limits are determined by use of carbides from said groups with different densities.

In practice an experimental expression is used allowing for a given type of carbide at predetermined strength properties to obtain necessary value of transport porosity which, depending on active agent in the pores, can determine kinetics of the process. This expression is as follows:

$$\Delta m = Q(\varepsilon_0 - v_{tr})/(1 - \varepsilon_0) \qquad (4)$$

where
$\Delta m$—relative change of intermediate body mass, g/g;
$\varepsilon_0$—porosity of intermediate body, vol %;
$V_{tr}$—predetermined volumetric content of transport pores, vol %;

$$Q = \rho_c / \rho_{mix}$$

where
$\rho_c$—density of carbon, g/ccm:
$\rho_{mix}$—density of carbides mixture, g/ccm.

In order to obtain an article with nanopores of different sizes, making it possible to realize selective filtration and adsorption, more than one carbide should be chosen. For this goal the formula (1) or an experimentally determined pore size value is used and the following dependence, confirmed experimentally, allows an determination of the part of each carbide in the mixture necessary to manufacture such an article;

$$\Psi_i = K_i \varphi_i \Big/ \sum_{i=1}^{n} K_i \varphi_i \qquad (5)$$

where
$\psi_i$—volumetric part of nanopores with size $x_i$ in total volume of nanopores;
$\varphi_i$—volumetric part of i-th carbide in powder mixture;
n—number of carbides;

$$K_i = 1 - \nu M_c \rho_{ki} / M_{ki} \rho_c$$

where
$M_c$—molecular mass of carbon, g/mole;
$M_{ki}$—molecular mass of i-th carbide, g/mole;
$\rho_{ki}$—density of it-h carbide, g/ccm;
$\rho_c$—density of carbon, g/ccm;
$\nu$—number of carbon atoms in carbide molecule.

In order to obtain a uniform distribution of nanopores throughout the article volume a mixture is formed with uniformly distributed powders of various carbides in it (homogeneous mixture); if it is necessary to obtain nanopores distributed throughout the volume in a desired order a mixture is prepared by means of any known method with particles distributed according to the desired order, e.g. layerwise.

After completed forming, a workpiece is obtained as a rigid carbonaceous skeleton with transport porosity formed in its volume allowing to obtain in the step of thermochemical treatment uniform nanopores of a predetermined size.

In order to form nanoporosity the obtained workpiece is subjected to thermochemnical treatment by chlorine at 500–1100° C. Nanoporosity is formed at removal of volatile chlorides of carbide-forming elements in accordance with reaction:

$$E_kC_f + (km/2n)Cl_2 \rightarrow k/n\, E_nCl_m \uparrow + fC \qquad (6)$$

where
$E_kC_f$—primary carbide;
k, f, n, m—stoichiometric coefficients.

The treatment is carried out until mass change of the workpiece has stopped.

A finished article produced by the described method has a predetermined shape and size, and its structure is a porous carbon skeleton with transport porosity of 10–55% obtained in the step of forming and nanoporosity of 15–50% volume.

The article comprises one or several types of nanopores and each type is being characterized with narrow distribution by size. Carbon content in the skeleton is more than 95 wt %, preferably 99 wt %, i.e., practically, the obtained article consists of pure carbon and has considerable strength allowing to increase its life time and expand application range under conditions when shape maintaining during operation is necessary.

As a result of selecting appropriate carbides and accomplishment of forming under conditions determined beforehand by means of relationships established by the inventors, a finished article is obtained with nanopore sizes, volume and distribution corresponding to those of the object of the article operation.

Among possible forming methods to realize the said method pressing, slip casting, tape casting and slurry casting can be named.

A formed intermediate body is treated in a medium of at least one hydrocarbon selected from the group comprising acetylene, methane, ethane, propane, pentane, hexane, benzene and their derivatives. When using hydrocarbons from the said group an optimal temperature range is 550–1200° C., the decomposition temperatures for these hydrocarbons falling within this range. It is also possible to use natural gas and in this case it is expedient to keep temperature in the range of 750–950° C.

A halogenation is carried out just like in the known method, with the temperature being selected in the range of 350–1200° C., depending on the nature of initial carbides and the formed volatile halogenides. Under these conditions volatile halogenides of carbide-forming elements are completely removed out of the article according to a reaction similar to reaction (6). However, only halogens and halogenides which do not react with carbon under the prevailing temperature conditions may be used.

The claimed concept is further elucidated with the following examples.

EXAMPLE 1

An example of producing an article in the tablet form with sizes d=20 mm, h=5 mm, with nanopore size 0.8 nm and nanopore volume 0.3 ccm/ccm uniformly distributed throughout the article volume, suitable for forming on its surface a double electric layer of high capacitance in electrolyte solutions.

To produce an article on the basis of beforehand obtained dependence (1) for X=0.8 nm titanium carbide powder was chosen. By substitution of the values of molecular mass and density of titanium carbide and carbon ($M_c$=12 g/mole; $\rho_c$=2.2 g/ccm; $\rho_k$=$\rho_{TiC}$=4.92 g/ccm; $M_k$=$M_{TiC}$=59.88 g/mole) in the formula (1) the following is obtained:

R=12*4.92/59.88*2.2=0.448,    X=Z(1−0.448)/0.448=1.232Z nm;

Thus when Z is in the range of 0.65–0.75, the nanpore size of the produced carbon materials will be in the range of 0.8–0.92.

In order to obtain the predetermined volume of nanopores ($V_{np}$=0.3 ccm/ccm), prior to pressing a needed porosity of the intermediate body is determined by the relationship (3): where $\phi_i$=1, n=1, as follows $\epsilon_0$=[1−0.3/(1−0.448)]*100=46%

Amount of TiC powder necessary to produce an intermediate body which has the predetermined sizes and the obtained value of porosity is calculated by the following dependence:

$m=\rho_k(100-\epsilon_0)\cdot V/100$ where
V—article volume, V=($\pi d^2$/4)*h, ccm;
d—workpiece diameter, 2 cm;
h—workpiece height, 0.5 cm; hence:

$m$=4.92(100−46)(3.14*$2^2$/4)*0.5=5.01 g

The needed mass change of the intermediate body during pyrocarbon deposition is calculated by formula (4), assuming a transport porosity of 35 vol %

Then, $\Delta m$=[0.4476(46−35)/(100−46]*100=9.1%

A mixture is prepared using 5.01 g of TiC powder with a size of the particles of 20 μm. Ethyl alcohol is added in the amount of 10%, of the mass of the mixture. Then, an intermediate body is formed by pressing on a hydrostatic press machine (P-125) at 30±1 Mpa pressure. After the pressing, the intermediate body is dried at 150±10° C. during 1–1.5 hour until complete removal of temporary binder.

This is followed by pyrocarbon deposition on the intermediate body by means of heat treatment in natural gas medium at atmospheric pressure in a quartz continuous reactor at 850° C. during 12 hours until change of mass by 9.1%.

Then, the sample is chlorinated. The chlorination is carried out in a isothermal quartz reactor at 650° C. during 4 hours. Then a blow-through of the reactor with argon at a temperature of 800° C. is carried out to remove excessive chlorine out of the reactor zone and the internal surface of the sample.

Properties of the obtained material are presented in Table 1. From this table it is evident that the measured peak value of the nanopore size measured by gas porosimetry correspond to the calculated value.

Two articles produced according to Example 1 were saturated with 20% KOH solution by boiling and placing them in an electrolyte solution (20% KOH). Opposite by sign potential was applied to each of the articles to form a double electric layer in the material nanopore volume. In this case the specific electrical capacitance of the double electric layer formed in the material was 37.8 F/g.

Notes:
1) Total volume of pores is determined by hydrostatic method according to GOST 473.4–81.
2) Nanopore volume is determined by exsiccator method by adsorption of benzene under static conditions, see "Fundamentals of adsorption technology." Keltsev N. V., Moscow, Chemistry publishers, 1984, p. 33.
3) Transport pore volume is determined by formula $V_{tr}=V_\Sigma-V_{np}$.

4) Size of nanopores is determined by means of mercury and gas porosimetry (Micromeretics Auto Pore III and Micromeretics ASAP 2010, respectively). Data are shown in FIG. 2. Legend Hg denotes mercury porosimetry intrusion data, legend BJH denotes gas porosimetry desorption data analysed by the BJH method, and legend Micro denotes gas porosimetry data analysed by the Horvath-Kawazoe method.

The presented data allows one to draw the conclusion that a new method for producing a porous carbon article comprising transport pores and nanopores with controllable sizes and distribution of nanopores throughout its volume as well as volumetric content of both types of porosity has been developed. The articles according to the invention can find wide application for adsorption and microdosage of substances, purification and separation of cryogenic liquids and gas mixtures, as high-porous electrode materials etc. owing to presence of porosity of desired sizes.

By the inventive method it is possible to produce nanopore volume and size or sizes by a mechanism independent from the mechanism for producing transport porosity in the materials produced, thereby making it possible to control purposely parameters of their porous structure. At development of adsorption materials, for instance, the following parameters can be optimized when using the present invention:

1) adaptability to manufacture of devices working components made of these materials;

2) optimal relationship between volumes of transport pores and nanopores which provide effective adsorption;

3) mechanical strength;

4) increased heat conductivity allowing to use these materials in cryo-adsorption evacuation elements.

Furthermore, the present method, besides the advantages pointed out, allows production of articles of complex shapes, in particular, of shapes impossible to obtain by any other known method, with minimum machining required. Owing to high mechanical strength the articles according to the invention can be used under conditions demanding maintenance of their shape.

What is claimed is:

1. A method for producing a porous carbon article comprising the steps of:

selecting powders of at least one carbide of an element selected from the group consisting of Group III, IV, V and VI of Mendeleyv's Periodic System, the at least one carbide having physical and chemical constants to obtain a porous carbon article having a desired nanoporosity by calculating using the relationship:

$$X=Z*(1-R)/R$$

where X=specified size of desired nanopores and $X \leq 10$ nm;

$$Z=0.65-0.75 \text{ nm};$$

$$R=\nu M_c \rho_k / M_k \rho_c$$

where $M_c$—molecular mass of carbon, g/mole;
$M_k$—molecular mass of the selected carbide, g/mole;
$\rho_k$—density of the selected carbide, g/ccm;
$\rho_c$—density of carbon, g/ccm;
$\nu$—number of carbon atoms in carbide molecule;

forming an intermediate body with transport pores having a size larger than 100 nm by shaping the selected powders;

heat treating the intermediate body in a medium of gaseous hydrocarbon or hydrocarbon mixtures at a temperature exceeding the decomposition temperature for the hydrocarbon or hydrocarbons until the mass of the intermediate body has increased at least 3% thereby producing a work piece in the form of a rigid carbonaceous skeleton; and thereafter thermochemically treating the work piece in a medium of a gaseous halogen to produce the porous carbon article having nanopores of a size X.

2. The method according to claim 1, wherein the carbide powders are chosen in dependence of desired distribution of nanopores by sizes using the relationship:

$$\psi_i = K_i \phi_i / \Sigma K_i \phi_i$$

where $\psi_i$—volumetric part of nanopores with size $x_i$ in total volume of nanopores;

$\phi_i$—volumetric part of i-th carbide in particle mixture;
n—number of carbides;

$$K_i = 1 - \nu M_c \rho_{ki} / M_{ki} \rho_c$$

where $M_c$—molecular mass of carbon, g/mole;
$M_{ki}$—molecular mass of i-th carbide, g/mole;
$\rho_{ki}$—density of i-th carbide, g/ccm;
$\rho_c$—density of carbon, g/ccm;
N—number of carbon atoms in carbide molecule.

3. The method according to claim 1, wherein the intermediate body has a porosity of 30–70 vol %.

4. The method according to claim 1, wherein the treatment in a medium of gaseous hydrocarbon or hydrocarbon mixtures is carried out until the mass of the intermediate body has changed according to the following relationship:

$$\Delta m = Q(\epsilon_0 - V_{tr})/(1-\epsilon_0)$$

where $\Delta m$—relative change of intermediate body mass, g/g;
$\epsilon_0$—porosity of intermediate body, vol %;
$V_{tr}$—predetermined volumetric content of transport pores, vol %;

$$Q = \rho_c / \rho_{mix}$$

where $\rho_c$=density of carbon, g/ccm;
$\rho_{mix}$=density of carbides mixture, g/ccm.

5. The method according to claim 1, wherein the intermediate body is formed by pressing.

6. The method according to claim 1, wherein the intermediate body is formed by slip casting, tape casting or slurry casting.

7. The method according to claim 1, wherein the mixture of hydrocarbons comprises a natural gas.

8. The method according to claim 7, wherein the treating in hydrocarbon medium is carried out at 750–950° C.

9. The method according to claim 1, wherein at least one of the hydrocarbons used during the treatment of the intermediate body in hydrocarbons medium is selected from the group consisting of acetylene, methane, ethane, propane, pentane, hexane, benzene and their derivatives.

10. The method according to claim 9, wherein the treating in hydrocarbon medium is carried out at 550–1200° C.

11. The method according to claim 1, wherein the particles of carbide or carbides of which the intermediate body is formed are arranged uniformly throughout its volume.

12. The method according to claim 1, wherein the particles of carbide or carbides of which the intermediate body is formed are arranged nonuniformly throughout its volume.

13. The method according to claim 1, wherein the gaseous halogen comprises chlorine.

14. The method according to claim 1, wherein the thermochemical treatment of the workpiece is carried out at 350–1200° C.

15. The method according to claim 14, wherein the thermochemical treatment is carried out at 500–1100° C.

16. The method according to claim 3, wherein the intermediate body has a porosity of 35–50 vol %.

17. A method for producing a porous carbon article comprising the steps of:

selecting powders of at least one carbide of an element selected from the group consisting of Group III, IV, V and VI of Mendeleyv's Periodic System, the at least one carbide having physical and chemical constants to obtain a porous carbon article having a desired nanoporosity by calculating using the relationship:

$$X=Z*(1-R)/R$$

where X=specified size of desired nanopores and $X \leq 10$ nm, nm;

$$Z=0.65-0.75 \text{ nm};$$

$$R=\nu M_c=\rho_k/M_k\rho_c$$

where
- $M_c$—molecular mass of carbon, g/mole;
- $M_k$—molecular mass of the selected carbide, g/mole;
- $\rho_k$—density of the selected carbide, g/ccm;
- $\rho_c$—density of carbon, g/ccm;
- $\nu$—number of carbon atoms in carbide molecule;

forming an intermediate body with transport pores having a size larger than 100 nm by shaping the selected powders;

heat treating the intermediate body in a medium of gaseous hydrocarbon or hydrocarbon mixtures at a temperature exceeding the decomposition temperature for the hydrocarbon or hydrocarbons until the mass of the intermediate body has increased at least 3% thereby producing a workpiece in the form of a rigid carbonaceous skeleton; and thereafter thermochemically treating the work piece in a medium of a gaseous halogen to produce the porous carbon article having nanopores of a size X, and wherein the intermediate body has a porosity determined with the following relationship:

$$\epsilon_0=(1-\nu_{np}/\Sigma K_i\phi_i)*100$$

$\epsilon_0$ porosity of intermediate body vol %;
where
- $\phi_i$—volumetric part of i-th carbide in particle mixture;
- $\nu_{np}$—predetermined volumetric part of nanopores in final article;

$$K_i=1-\nu M_c\nu_{ki}/M_{ki}\nu_c$$

where
- $M_c$—molecular mass of carbon, g/mole;
- $M_k$—molecular mass of i-th carbide, g/mole;
- $\rho_{ki}$—density of i-th carbide, g/ccm;
- $\rho_c$—density of carbon, g/ccm;
- $\nu$—number of carbon atoms in carbide molecule.

* * * * *